United States Patent
Barrero Acosta et al.

(10) Patent No.: US 11,578,279 B2
(45) Date of Patent: Feb. 14, 2023

(54) METHOD FOR IMPROVING THE FLOW CAPACITY AND INCREASING THE DILUTION CAPACITY OF DILUENTS IN METHODS FOR THE PRODUCTION AND TRANSPORT OF HEAVY AND EXTRA-HEAVY CRUDE OILS COMING FROM THE DIFFERENT PHASES OF RECOVERY OF DEPOSITS (PRIMARY, SECONDARY AND ENHANCED)

(71) Applicants: ECOPETROL S.A., Santander (CO); POLYNEX S.A.S., Bogotá D.C. (CO)

(72) Inventors: Rigoberto Barrero Acosta, Santander (CO); Diego Mauricio Beltran Lopez, Cundinamarca (CO); Jaime Borrero Gomez, Cundinamarca (CO); Alexis Bueno Velandia, Santander (CO); Claudia Esneiden Cuadro Ardila, Santander (CO); Luz Angela Novoa Mantilla, Santander (CO); Lilia Rodriguez Rodriguez, Santander (CO); Rafael Zamora Sanchez, Cundinamarca (CO)

(73) Assignees: ECOPETROL S.A., Santander (CO); POLYNEX S.A.S., Bogotá D.C. (CO)

( * ) Notice: Subject to any disclaimer, the term of this patent is extended or adjusted under 35 U.S.C. 154(b) by 0 days.

(21) Appl. No.: 16/628,915

(22) PCT Filed: Jul. 5, 2018

(86) PCT No.: PCT/CO2018/000015
§ 371 (c)(1),
(2) Date: Jun. 16, 2020

(87) PCT Pub. No.: WO2019/007445
PCT Pub. Date: Jan. 10, 2019

(65) Prior Publication Data
US 2020/0308499 A1 Oct. 1, 2020

(30) Foreign Application Priority Data
Jul. 5, 2017 (CO) .................. NC2017/0006772

(51) Int. Cl.
*C10G 71/00* (2006.01)
*E21B 43/16* (2006.01)

(52) U.S. Cl.
CPC .............. *C10G 71/00* (2013.01); *E21B 43/16* (2013.01); *C10G 2300/104* (2013.01); *C10G 2300/1014* (2013.01); *C10G 2300/1044* (2013.01); *C10G 2300/1055* (2013.01); *C10G 2300/302* (2013.01); *C10G 2300/80* (2013.01)

(58) Field of Classification Search
CPC ............ C10G 71/00; C10G 2300/1014; C10G 2300/104; C10G 2300/1044; C10G 2300/1055; C10G 2300/302; C10G 2300/80; E21B 43/16; C09K 8/035; C09K 8/58; C09K 8/584; C10M 101/02
See application file for complete search history.

(56) References Cited

U.S. PATENT DOCUMENTS

| | | |
|---|---|---|
| 2012/0261312 A1 | 10/2012 | Flores Oropeza et al. |
| 2013/0172218 A1 | 7/2013 | Labarca Finol et al. |
| 2014/0238901 A1 | 8/2014 | Flores Oropeza et al. |
| 2015/0111799 A1 | 4/2015 | Miranda Olvera et al. |
| 2016/0102241 A1 | 4/2016 | Bello |

FOREIGN PATENT DOCUMENTS

| | | |
|---|---|---|
| CA | 2896451 A1 | 1/2016 |
| RU | 2013107628 A | 9/2014 |
| WO | 2015/100517 A1 | 7/2015 |
| WO | 2017/040412 A1 | 3/2017 |

OTHER PUBLICATIONS

International Search Report for PCT Application No. PCT/CO2018/000015 dated Oct. 31, 2018 (3 pages).
Written Opinion for PCT Application No. PCT/CO2018/000015 dated Oct. 31, 2018 (12 pages).
Martinez-Palou et al., "Study of the Formation and Breaking of Extra-Heavy-Crude-Oil-in-Water Emulsions—A Proposed Strategy for Transporting Extra Heavy Crude Oils," Chemical Engineering and Processing: Process Intensification, 2015, 98:112-122, Abstract.

*Primary Examiner* — Thuan D Dang
(74) *Attorney, Agent, or Firm* — Daniel R. Evans; Merchant & Gould P.C.

(57) ABSTRACT

The invention relates to a method including a system of additives which increase fluidity and/or flow capacity and minimize pressure drops from the steps of lifting in production wells, collection lines, dehydration systems and ducts for transporting heavy and extra-heavy hydrocarbons. In addition, the injected system of chemical additives increases the dilution capacity of the solvents that need to be applied to improve the quality of the crude oil (reduce viscosity and density, and increase API gravity), thereby facilitating the dehydration and transport.

10 Claims, 10 Drawing Sheets

METHOD FOR IMPROVING THE FLOW CAPACITY AND INCREASING THE DILUTION CAPACITY OF DILUENTS IN METHODS FOR THE PRODUCTION AND TRANSPORT OF HEAVY AND EXTRA-HEAVY CRUDE OILS COMING FROM THE DIFFERENT PHASES OF RECOVERY OF DEPOSITS (PRIMARY, SECONDARY AND ENHANCED)

This application is a National Stage Application under 35 U.S.C. § 371 of International Application No. PCT/CO2018/000015 filed Jul. 5, 2018, which claims the benefit of priority to Colombian Patent Application No. NC2017/0006772 filed Jul. 5, 2017 the disclosures of all of which are hereby incorporated by reference in their entireties.

FIELD OF THE INVENTION

The present invention relates to the improvement of the process generated by a system of additives specialized in forming very low-viscosity dispersions (extra-heavy crude-water) and increasing the diluent properties of solvents used in the production of extra-heavy and heavy crudes, production being understood as stages of lifting, pickup, dehydration and transport.

SUMMARY

The present invention is related to a process that includes an additive system that increases fluidity and/or flow capacity and minimizes pressure drops from the lifting stages in producer wells, recollection lines, dehydration systems, and heavy and extra heavy crude oil transport pipelines. Additionally, the injected chemical additive system increases the dilution capacity of the solvents that need to be applied to improve the quality of the crude oil (reduce viscosity, density and increase in API Gravity), facilitating dehydration and transport.

The composition of the additive system according to the invention understands: high-efficiency oil and water-based dispersants for fluids in a wide temperature range, pour point reducers, biodegradable oils and organic solvents. The application of the additive system is carried out at two different points: top of the well and/or at the bottom of the well (place where the dispersion is formed) according to need; and downstream, at the points where it is necessary to add a diluent to reduce residence times in the removal of water and/or drainage of the internal phase.

STATE OF THE TECHNIQUE

To the date, conventional flow improver additives such as viscosity reducers, friction reducers, pour point reducers for heavy oil suitability are designed to act directly on the crude.

Although oil has experienced significant fluctuations in its prices in the last two years, it is clear that there are still no alternative energy sources to fossil fuels that are sufficient to supply world energy demand.

Since light crude reserves with API measures between 30 to 60 degrees are becoming more and more scarce, we have started with the exploitation of heavy and extra-heavy crudes, whose API degree values are between 6.5 and 22° API.

These heavy and extra-heavy crudes constitute a challenge in all phases of the production chain, such as lifting, harvesting, treatment, transportation, marketing and refining; Because they have a higher viscosity due to the presence of chemical compounds with a high level of aromatic rings in their structures, high molecular weight and relatively high polarities due to the presence of heavy metals and sulfur, so the infrastructure must be adapted to them. Another alternative is to adjust these crudes to the quality characteristics required by the existing infrastructure.

In the state of the art, the invention patent CA 2,896,451 reports a method to improve the mobility of heavy oil that includes mixing an additive that comprises saponins and fatty acids with a heavy oil, where the saponins are derived from Saponidus Saponaria. With respect to this priority, the present invention does not use saponin and the injection of the additive is carried out in the diluent and not in the heavy oil.

On the other hand, the patent RU2013/107628 reports a viscosity reducing additive for heavy oil-sand bituminous fractions, which includes sodium carboxylate which is a subproduct of the vegetable oil production industry which is added to heavy oil. With respect to this, the present invention does not use sodium carboxylate and the injection of the additive is realized in the diluent and not in the heavy oil.

International patent WO2015/100517 discloses an improved method for reducing the viscosity of crude oil over a wide temperature range, where the viscosity-reducing effect is achieved by introducing additives comprising polyvinyl alcohols (PVAs) into the oil. The resulting dispersion mix not only features improved mobility, but also facilitates recovery of the original crude. With respect to this, the present patent application does not use polyvinyl alcohols (PVAs), additionally it improves the viscosity index of the crude oil resulting in low and stable viscosities at different temperature ranges. The injection of the additive is done in the diluent and not in the heavy oil, improving the API gravity of the heavy crude.

For its part, document US2016/102241 discloses a viscosity reducer based on plant extracts of natural origin. Vegetable extracts include a mixture of phosphoglycerides and vegetable oils. It also discloses a method of reducing the viscosity of heavy and extra heavy crude oil, where aromatic based solvents are not required. A reduction in the use of diluents is achieved using the viscosity reducing vegetable extracts. The viscosity reducing composition includes a mixture of phosphoglycerides, vegetable oils, non-aromatic solvent, polycyclic aromatic hydrocarbon, and a stabilizer. With respect to this, the present invention does not use a mixture of phosphoglycerides that could generate an opposite effect over time, since they increase the viscosity of the system. The injection of the additive is carried out in the diluent and not in the heavy oil.

Finally, the scientific article titled "Study of the formation and breaking of extra-heavy-crude-oil-in-water emulsions-A proposed strategy for transporting extra heavy crude oils" by Ramirez Rafael and collaborators, published in 2015 in *Chemical Engineering and Processing* 98 (2015) pg. 112-122, a process for oil-in-water emulsions for heavy crudes preparation, especially for crudes with API degrees of less than 20 degrees is taught. In this article, different parameters such as temperature, stirring time and speed, the ratio between oil and water, and the concentrations of emulsifiers and demulsifiers for the formation and breakdown of emulsions are studied. The emulsions are prepared with the help of an emulsifier and these emulsions are subsequently broken with the addition of demulsifiers.

However, and as mentioned in the beginning, the state of the art discloses additives that are added directly to heavy crude with the aim of improving its fluidity and viscosity conditions. In most cases, the additive requires a mixing process by agitation for its incorporation into the crude and then the addition of large amounts of solvent such as naphtha or light crude.

In this sense, it is clear that there was an unsatisfied need in the state of the art for a viscosity-improving additive for heavy and extra-heavy crudes that could be advantageously added to the solvent and not to the crude as is conventionally done, in such a way that the diluent volumetric volumes are significantly reduced to achieve the required quality specifications thanks to the potentializing effect of the additive on the diluent.

DETAILED DESCRIPTION OF THE INVENTION

Figure 1:
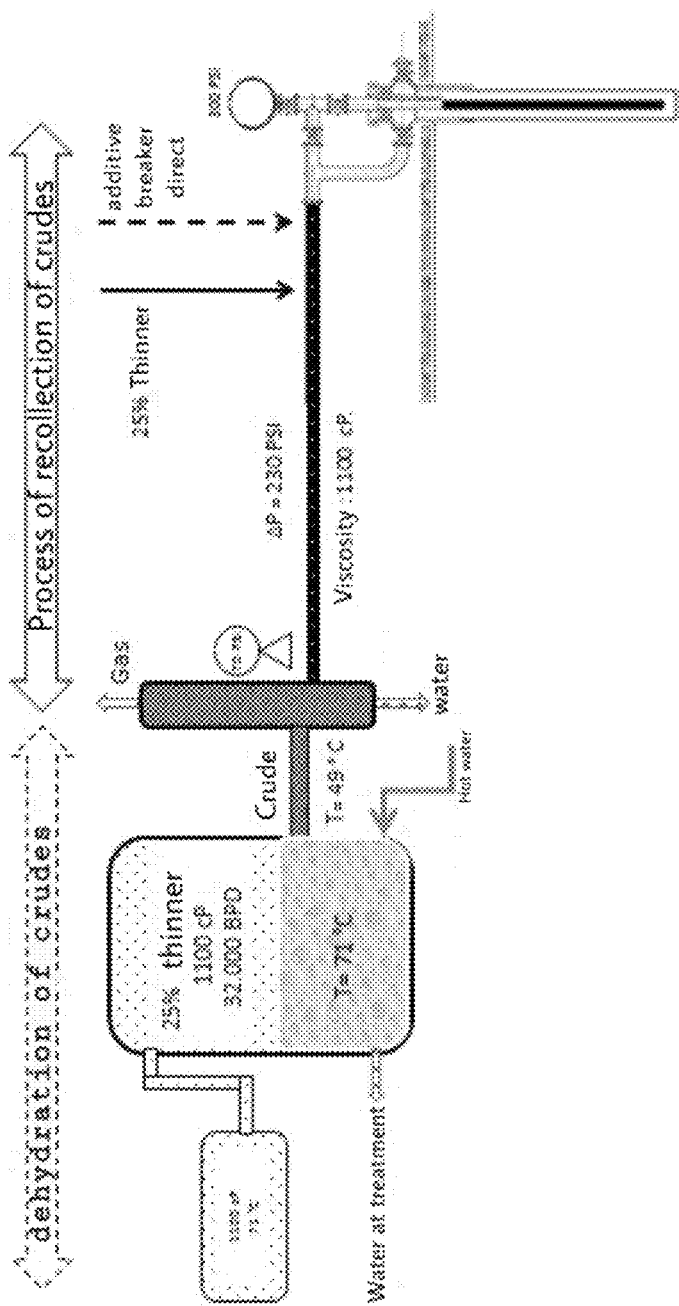
FIG. 1 shows the conventional collection process.

It is an object of the present invention, the additive system whose principle is, on the one hand, to achieve in the collection and treatment phases, the instantaneous formation of a dispersion of crude in water with a stable flow pattern of homogeneous characteristics. This dispersion generates a drastic reduction in the viscosity and thanks to the amphiphilic and lubricating of this product, the sticky conditions of the crude are eliminated, facilitating its rapid movement through internal cavities of pumps and transport pipes.

An effect also obtained by the additive system of the invention is the reduction of the internal friction of the system, resulting in a significant reduction in pressure drops (energy saving) in the pumping systems, facilitating their lifting process to facilities of treatment and eliminating the need to dilute with solvents at the top of the pits. Once the dispersion is formed with the addition of additive E (composition according to the invention) at the wellhead reaches the treatment facilities, the other component (additive G which is another composition according to the invention) is injected directly into the Conventional solvent that already incorporates the direct breaker, thus modifying the density and viscosity of extra-heavy crudes, necessary parameters for the processes to be carried out of dehydration and emulsion treatment (breaking).

In addition to the effect mentioned, a reduction in viscosity is achieved in the crude-diluent mixture, due to the fact that the oleophilic capacity of the diluent is potentiated and its volatility is reduced (losses by evaporation). With the above, the additive system of the present invention has the following identified functions: Generate an instant crude-water dispersion (water that comes from the formation); reduce the friction of the fluid in contact with the walls of the pit, pumps and lines of conduction thanks to its lubricating effect; reduce the viscosity of the crude-water system by increasing the linear speed in pipes; reduce the adherent characteristics of the crude oil eliminating the encapsulation of water in its bosom and elimination of contact with the pumping infrastructure, thereby significantly reducing pressure drops in the pipes, therefore generating an increase in pumping capacity; increase in the speed of diffusion of the diluent in the crude oil thanks to its oleic affinity; reducing losses by evaporation of the diluent; modifying the viscosity index of the dispersed system, and decreasing the diluent consumption to reach viscosity specifications in treaters and conveyor lines (lower volumes of diluent required for a given viscosity).

The stability of the dispersion formed with the additive system under confined condition (Break process in dehydration tanks) generates rapid phase segregation. Under evacuation conditions in flow lines, if there is a stop, phase segregation may be generated, however, with a minimum disturbance, homologous to that generated when restarting pumping, it recovers the original rheological characteristics with a viscosity variation of more or minus 5% (±5%).

The additive system of the present invention is composed of:

High efficiency oil-based fluid dispersants at low temperatures. These oil-based fluid dispersants, components of Additive G, understand but are not limited to fatty acids and esters from vegetable oils such as ricinoleic fatty acid (12-hydroxy-9-cis-octadecenoic acid) unsaturated, phosphatidyl choline, esters of glycerol, butyl acid, lauric, palmitic, stearic, oleic acid, pine oil, ethoxylated alkyl phenol or mixtures thereof in aliphatic and/or aromatic alcohols with carbon number between 2 and 22 carbon atoms (C2-C30) and/or its ethoxylated compounds or combinations thereof, in concentration ranges between 10 and 30% by weight, more preferably between 15-22% and organic solvents The components with surfactant characteristics of additive E to improve the flow capacity in collection ducts, include but are not limited to aliphatic and/or aromatic alcohols with carbon numbers between 2 and 22 carbon atoms (C2-C30) and/or its ethoxylated compounds in concentration ranges between 5 and 55% by weight, more preferably between 12 and 35% by weight;

Primary, secondary and tertiary alcohols or mixtures thereof, where the alcohols can be methanol, ethanol, propanol, isopropanol, butanol, isobutanol, terbutanol, in concentration ranges between 2 and 10% by weight;

sodium, potassium, calcium alkyl sulfonates or a mixture thereof in a concentration between 0.5 and 10% by weight; wherein alkyl means one or two hydrocarbon groups of 1 to 30 linear or branched carbon atoms, for example LAS or sodium dodecylbenzenesulfonate.

sodium, potassium, calcium and magnesium hydroxides or mixtures thereof in a concentration between 0.4 and 20%, preferably between 0.4 and 9% by weight;

2- to 6-carbon ethers, such as, but not limited to, methoxyethane, methoxymethane, 3,3-oxypropane, ethane-oxyethane, ethyl ether, or mixtures thereof, in concentrations ranging from 2 to 18% by weight sulfonated vegetable oils such as olive oil, sunflower oil, soybean oil, palm oil, sesame oil, peanut oil, safflower oil, rapeseed oil or combinations thereof in concentrations between 2 and 8% in weigh; water in weight concentration between 3.5 and 8% and Organic solvents The organic solvents for the additive system of the present invention can be of the aliphatic or aromatic type, where the aliphatic solvents can include but are not limited to straight or cyclic chain carbon compounds and that contain chemical functions such as alcohols, ketones, ethers, esters, amines and amides, among others, all of them of straight or branched chain, where the aliphatic solvents contain from 1 to 18 carbon atoms, in concentration ranges between 5 to 24% by weight. Aromatic solvents can include but are not limited to aromatic solvents such as benzene, xylene, or -xylene; toluene or any other benzene-based solvent with one or more chains of straight or branched chain aliphatic substituents comprising between 1 and 12 carbon atoms, in concentration ranges between 2 to 34% by weight. The present invention may comprise the mixture of one or more of these aliphatic and/or aromatic organic solvents and its concentration in the additive system of the invention is in a range from 42% to 78%.

Alcohols with carbon numbers between 2 and 22 carbon atoms (C2-C30) and their corresponding ethoxylated compounds for both the additive E and additive G according to the present invention, may be but are not limited to alcohols and ethoxylates of dodecanol, tridecanol, tetradecanol, penradecanol, hexadecanol, palmitoleic alcohol, heptadecanol, octadecanol, oleic alcohol, nanodecanol, elisocanol, docosanol or mixtures thereof or their corresponding isomers. Alcohols can contain from 1 to 22 OH groups that can be partially or totally ethoxylated.

In the harvesting process with the additive system of the present invention the concentration of the additive E can be in a concentration between 350 and 1500 ppm, preferably between 600 and 1000 ppm and more preferably between 650 and 800. In one embodiment, the concentration of additive E is 750 ppm.

In the harvesting process with the additive system of the present invention, the concentration of additive G in the treatment and dehydration stage of heavy and extra-heavy crudes can be in a concentration between 500 and 2000 ppm, preferably between 800 and 1500 ppm and more preferably between 900 and 1200. In one embodiment, the concentration of additive G is 1000 ppm According with another object of the present invention, a process is disclosed to improve the flow capacity and enhance the dilution capacity of diluents in production and transport processes of heavy and extra-heavy crudes from different recovery phases of reservoirs (primary, secondary and improved), specifically the application of the additive system, where in an initial stage, an additive according to the invention is applied in the lifting and harvesting process step (Bottom or top of the pit, whichever applies), where the additive promotes dispersion, and this operation does not require any type of mechanical element and/or homogenizer since the dispersion is generated immediately, spontaneously forming a thick dispersion with ranges of drop size between 250 and 1200 microns and very low viscosity.

The second stage of the process is carried out with the application of an additional additive (Additive G) according to the present invention in the dehydration step in the treatment facilities (Tanks and/or treaters): The conventional operation of diluting with diluents With carbon chains between C5 to C12, the purpose was to modify the density of the heavy hydrocarbon. Now, according to the process of the invention, it is carried out by directly adding the diluent capacity enhancing additive before it is mixed with the heavy and/or extra-heavy crude. The diluent, already potentiated with the additive of the invention, diffuses easily into the crude at low effort, that is, it does not require additional agitation equipment so that the additive diluent becomes part of the crude.

For presenting in its formulation components that reduce the pour point, quickly promote the diffusion of the diluent in the crude oil, and additionally the synergistic characteristics of these, allows the rapid drainage of the internal phase (water) of the crude oil, favoring rapid dehydration of the oleic phase and reducing losses due to evaporation of the diluent.

Therefore, a process of production and transportation of heavy and extra-heavy crudes from conventional recoveries, characterized in that it comprises the steps of a) Add one of the additives of the invention (additive E), which is characterized by being soluble in water and dispersing the crude in the aqueous phase without requiring agitation, to the fluids coming from heavy crude or extra heavy crude and water. Considerably reducing the viscosity of the dispersion formed, it removes organic residues or dirt adhering to the internal walls of the pipe that reduce the effective internal diameter, increasing the evacuation capacity of the production of heavy and extra-heavy crudes, guaranteeing the integrity of the infrastructure. (by removing the organic dirt accumulated in the line that promotes the formation of colonies of sulfate-reducing bacteria that promote corrosion).

b) Synergy in the chemical additive system (E and G) of the invention to increase the flow capacity, enhance the dilution capacity of diluents, decrease losses by evaporation of diluent in the dilution process, reduce times and temperatures dehydration of heavy and extra-heavy crudes, optimizing treatment and transport costs, guaranteeing the integrity of the infrastructure.

Results obtained using the additive system of the invention

Instantaneous formation of a low viscosity crude-water dispersion without the need for mechanical elements or specific thermal conditions.

Reduction of the corrosion processes that impact the integrity of the infrastructure due to:

Minimizes pipe-water contact, which is directly responsible for the corrosion processes that impact the integrity of the infrastructure.

Minimizes the formation of organic deposits that interfere with the protection effect of corrosion inhibitors.

Allows optimization of the dosage of corrosion inhibiting and antifouling products Reduction of fluid friction in contact with the well walls, pumps and lines, thanks to its lubricating effect.

Reduction of the viscosity of the crude-water system by increasing the linear speed in pipes (increasing pumping capacity).

Reduction of the adherent properties of the crude oil eliminating the rigidity of the continuous phase and facilitating the orientation of the fluid which significantly reduces the pressure drops in the pipes (energy saving).

Increased diffusion speed of the diluent in the crude oil thanks to its oleic affinity, Maintain the original stability and rheological characteristics after a pumping stop, varying its viscosity magnitude by ±5%.

Reduction of the volatility and/or evaporativity of the diluent between 2% to 30% in the treatment and transport stage;

Decrease in diluent consumption by up to 35% in the process of collecting, dehydrating and transporting heavy crude;

Reduction in the cost of lifting and production of heavy and extra-heavy crude.

Reduction of the cost associated with the logistics necessary to have availability of the diluent in the field.

Reduction of costs in the purchase of the diluent because by reducing its volatility and/or evaporativity and increasing the dilution capacity by integrating these two variables, savings between 2 and 35% are achieved; eliminating the need to purchase a less volatile thinner (Lower RVP) which has a higher commercial value than the more volatile thinner (Higher RVP).

Example 1

The process that includes the additive system of the present invention in the lifting and harvesting stages of heavy and extra-heavy crudes, allows to eliminate the injection of the diluent required to reach flow specifications. Currently, between 15 and 32% of diluent is used to achieve flow specifications and pumping capacities of subsoil pumps from downhole to treatment facilities. This diluent volumetric is not required with the application of the additive system of the present invention because the dispersion formed modifies the viscosity and contact area characteristics to levels significantly lower than those achieved with conventional dilution. To clarify the before said, in a trunk for conventional collection of extra-heavy crudes (FIG. 1) the current conditions used are:

Diluent injection: 25%
Wellhead pressure: 300 psi (2.07 MPa).
Fluid viscosity: 1100 cP.
Pressure drops: 230 psi (1.59 MPa).
Flow: 32,000 BPD (211960 LPH liters per hour) of fluids (crude 30%, water 45%, diluent 25%, commercial direct breaker additive used in separation of direct emulsions W/O: 200 ppm
Pipe diameter: 16 inches (0.41 m).
Length: 12 kilometers.

Figure 2:
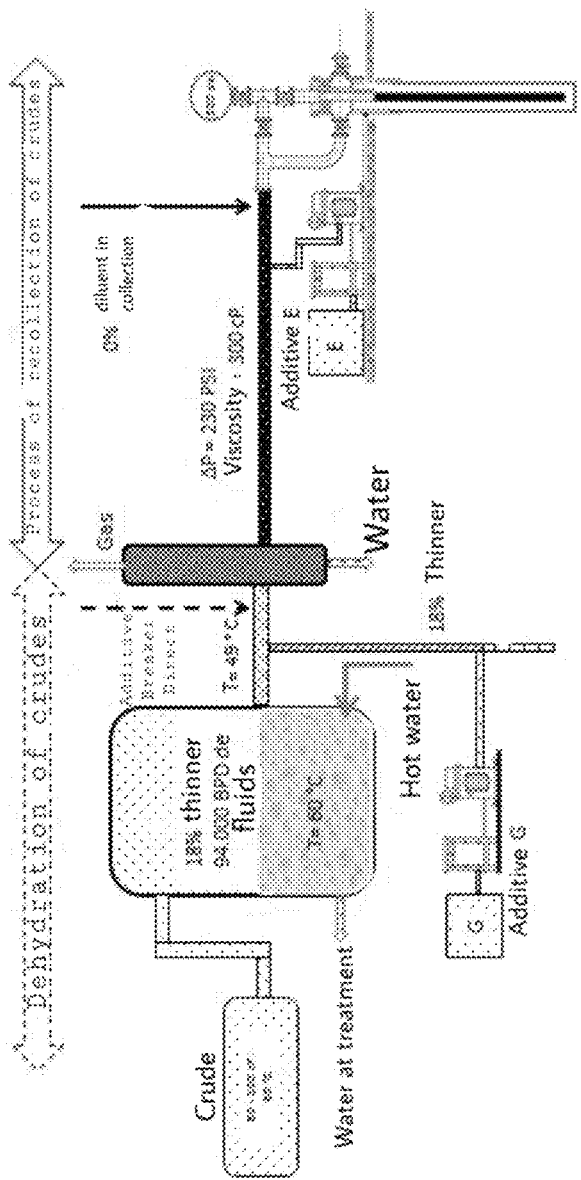
FIG. 2 shows the harvesting process according to the present invention, where the additives of the invention are used.

The harvesting process with the additive system of the present invention as shown in FIG. 2 has the following conditions:

Diluent injection: 0% (It is eliminated).
Injection of additive E: 750 ppm
Wellhead pressure: 300 psi (2.07 MPa).
Fluid viscosity: 300 cP.
Pressure drops: 230 psi (1.59 MPa).
Flow: 94,000 BPD of fluids (crude 40%, water 60%, diluent 0%, direct breaker additive 0 ppm).
Pipe diameter: 16 inches (0.14 m).
Length of the collection pipe from top of the pit to Treatment Plant: 12 kilometers.

Example 2

The process that includes the additive system of the present invention in the treatment and dehydration stages of heavy and extra-heavy crudes, allows the dilution capacity of the diluent to be potentiated in heavy and extra-heavy crudes. This potentialization occurs due to the increase in the dilution rate of the diluent in the crude structure due to the oleophilic affinity of one of the components of the additive system (additive G) proposed in the present invention.

Figure 3:
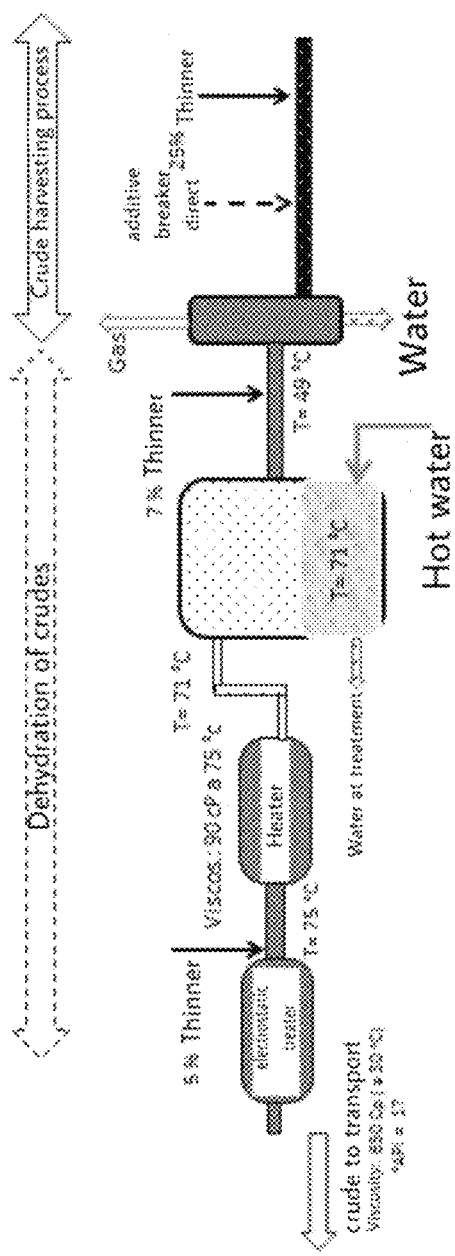
FIG. 3 shows the current treatment system.

The current conventional process of treatment and dehydration of heavy and extra-heavy crudes requires a diluent volumetric between 5 and 37% to reach the required viscosity specifications. With the additive process and system of the present invention, the diluent consumption is reduced by up to 35% of the current requirement. To clarify the above, in treatment facilities for heavy and extra-heavy crudes as shown in FIG. 3, the current conventional conditions used are:

Total diluent injection: 37% (25% in collection and 12% in dehydration).
Treatment temperature (dehydration): between 68 and 75° C.
Viscosity of the fluid after dehydration for transport: 650 cP at 30° C.

Figure 4:
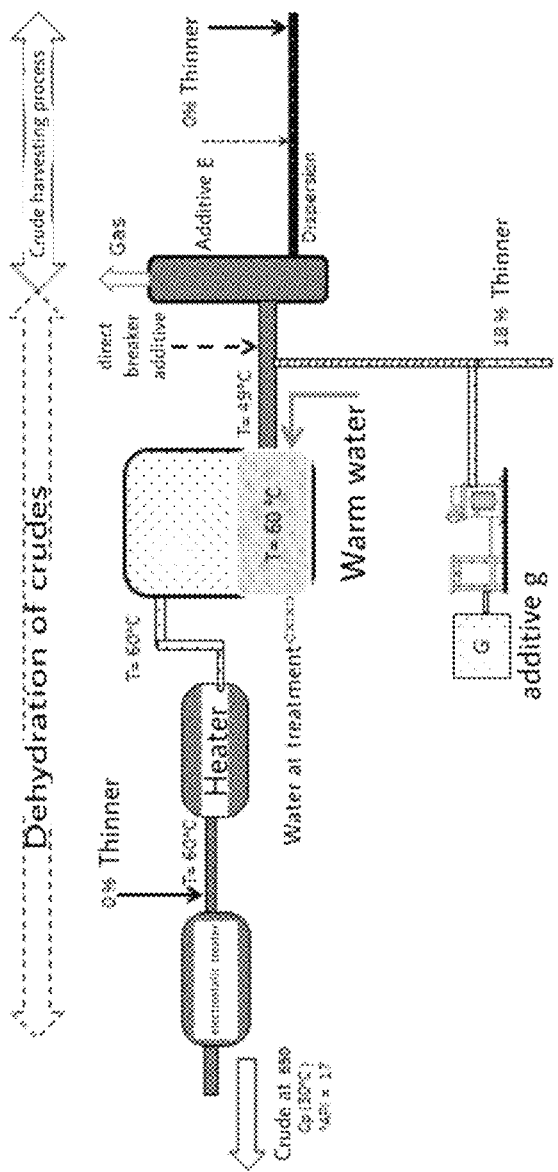
FIG. 4 shows the treatment system according to the present invention, where the additives of the invention are used.

The process and additive system of the present invention have the following conditions as shown in FIG. 4:

Total injection of diluent: 18%-20%
Treatment temperature: 60° C.-70° C.
Viscosity of the fluid after dehydration for transport: 650 cP at 30° C.
Additive G 1000 ppm to 1000 ppm
Composition additive G in example 2 and 3
Toluene 20%-30% by weight
O-Xylene 20%-30% by weight
Oleic Acid 15%-25% by weight
Ricinoleic Acid 15%-25% by weight
Alkyl phenol ethoxylated 8%-13% by weight
Butyl glycol 12%-17% by weight
Iso propanol 10%-16% by weight According to what is shown in FIGS. 1 to 4, the proposed process with the additive system produced by this invention has a significant increase in dilution power by up to 35% of conventional diluents usually used such as natural gasoline, virgin naphtha, cracked naphthas, condensates, aromatic currents and mixtures of these in the lifting, harvesting, treating and transporting processes of heavy and extra-heavy crudes.

Additionally, it reduces evaporation rates between 2 and 30% of the light diluents used in the treatment and transport processes of heavy and extra-heavy crudes for collection and treatment temperature ranges between 25° C. and 85° C.

Also, the process proposed with the additive system product of this invention improves the dehydration processes of heavy and extra-heavy crudes, to achieve faster and more efficient dehydration of crude oil by promoting greater coalescence of water droplets by the magnification of the interfacial area with which the residence times are reduced between 1 to 6 hours in the treatment systems, leaving the crude in the specifications required by the industry (% BSW≤0.5).

The process proposed with the additive system product of this invention improves the viscosity index of crude-diluent mixtures by maintaining viscosity magnitudes within the range of plus or minus 5% of the viscosity value with temperature variation, this due to the lubricating characteristic of one of its components (additive G).

The process proposed with the additive system product of this invention generates an effect on the surface tension of the diluent, which allows increasing the contact area of the diluent-heavy and/or extra-heavy crude, increasing its diffusion speed in the crude. This characteristic guarantees a high homogeneity and stability of the mixture over time additive G).

Additionally, it is observed that there is no effect on the quality parameters of the separated water in the dehydration phase.

The process proposed with the additive system product of this invention generates a positive effect on the integrity of the lifting, collection, treatment and transport infrastructure. Due to the surfactant, lubricant and detergent characteristics of the process additive system, the formation and/or accumulation of organic material that affects the efficiency of corrosion inhibitors is reduced.

The process proposed with the additive system product of this invention removes and avoids the formation of organic deposits that decrease the effective diameter of the pipes, which reduces pressure drops and increases the flow capacity in the collection and treatment stages.

The additive system product of this invention proved to be compatible with the additives used in the lifting processes and surface facilities such as biocides, antifouling, oxygen scavengers, corrosion inhibitors, direct breakers, reverse breakers, flocculants and clarifiers.

The efficiency of the additive system is not affected by variations in temperature. The experimentation carried out in the range between 10° C. to 88° C., verifying the viscosity parameters of the treated fluids, showed no variations in performance, that is, the viscosity verified before and after being added to the mentioned temperature range, showed no variations greater than the viscosity test uncertainty ($\pm 5\%$).

The process is not affected by high shear efforts, implying that the properties of the additive diluent do not change due to operational effects (centrifugal pumps, positive displacement pumps, pressure drop reducing valves, elbows, orifice type flow meters, atomization, etc.). The validations carried out at high shear cut, between 800 and 4500 rpm did not show any effect on the viscosity of the additive mixtures.

The additive system does not affect the quality of the crude oil cuts in the refining processes. The characteristics of the ASSAY II parameters confirmed that they remain unaffected and were shown within the uncertainty of each parameter.

It is evident that the process and the system of additives according to the present invention have positive synergy since when using only the additive E, in the process, it does not present the same effect of the resulting viscosity index as when using E and G. Even when using only G, the same level of diluent savings is not obtained compared to that achieved when using E and G according to the present invention.

In the production, dehydration and transportation process of heavy and extra-heavy crudes from conventional recoveries according to the invention, the diluents to which the additives are added may be but are not limited to gasoline, naphtha, diesel, biodiesel, liquefied gas of petroleum or mixtures thereof. Therefore, the additives of the invention can be added to gasoline, diesel and biodiesel type fuels.

Example 3. Effect of the "EG" Additive System on the Reduction of Viscosity

Figure 5:
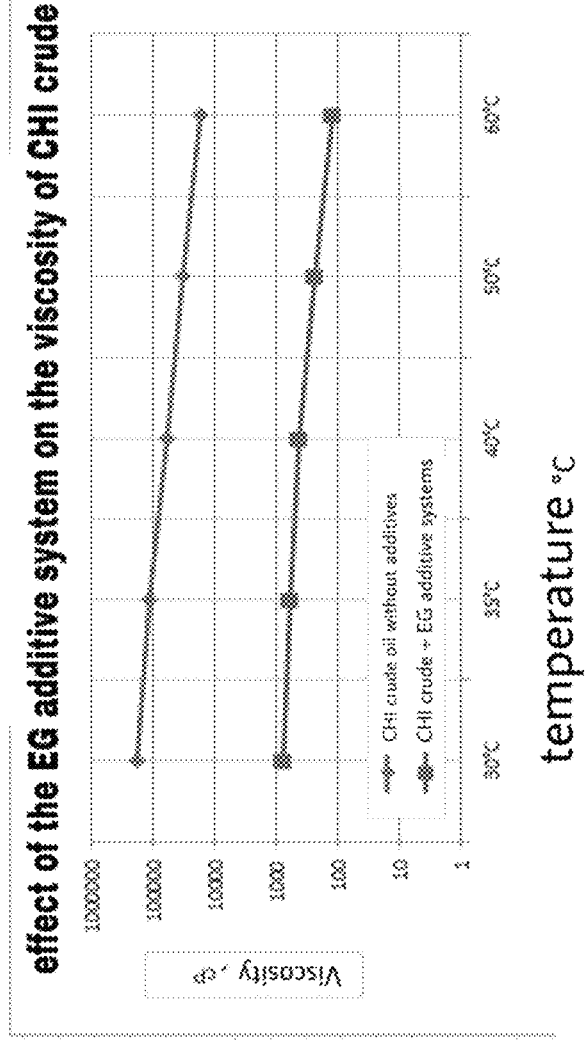
FIG. 5 shows the effect of the "EG" Additive system according to the invention in the reduction of viscosity.

As shown in FIG. 5, with the additive system of the present invention and the process shows an effect on viscosity reduction. For this example, the behavior of an extra-heavy crude called "CHI" at different temperatures (30 to 60° C.) was observed and analyzed, compared to the crude "CHI" added with EG, that is to say, adding in the process the additive composition E and then the additive composition G according to the invention, it can be seen that there was a very significant decrease in viscosity from 150,000 cP to 900 cP under the same test conditions.

Figure 6:
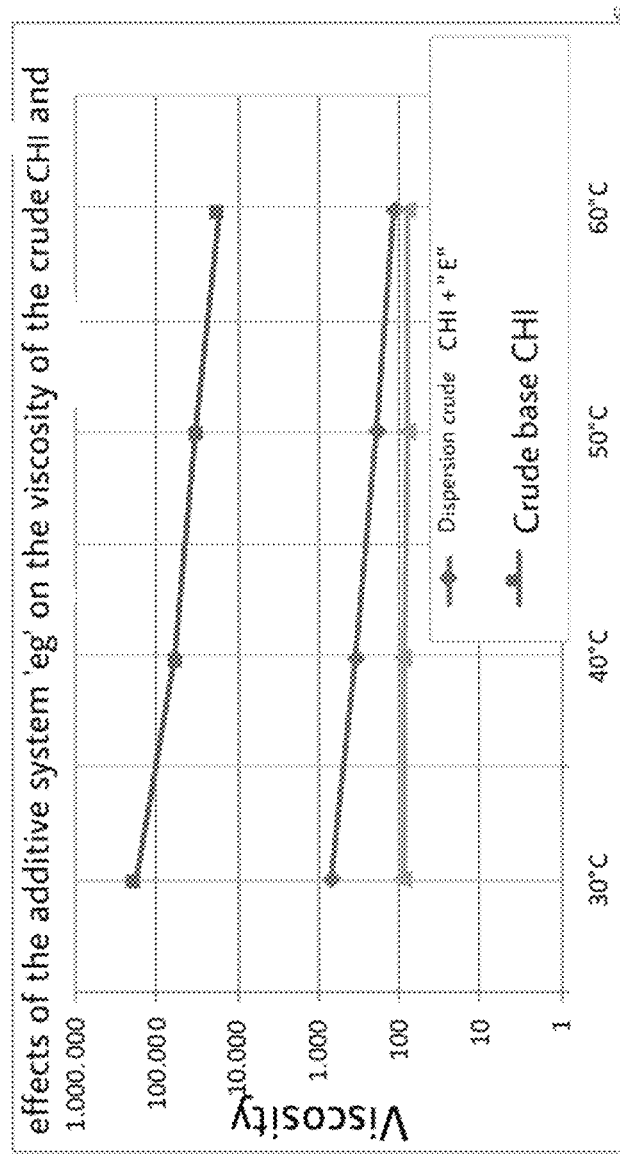
FIG. 6 shows the Synergy effect of the Additive system according to the invention.

Example 4. Effect of the Synergy of the Additive System "E" and "G" on the Viscosity of Crude Oil—Dispersion Extra Heavy Crude Oil 7-20° API As shown in FIG. 6, a Synergy effect of the Additive system is evident since, as can be seen, there is a positive synergy when using the EG additive system, compared to the effect of the additive E when applied without the presence of G, showing a further decrease in viscosity. Furthermore, the rheological behavior for the EG case does not present a variation in viscosity with respect to temperature.

Example 5. Effect of the Additive System "EG" on the Dilution Capacity of Diluent "N" (Naphtha)

Figure 7:
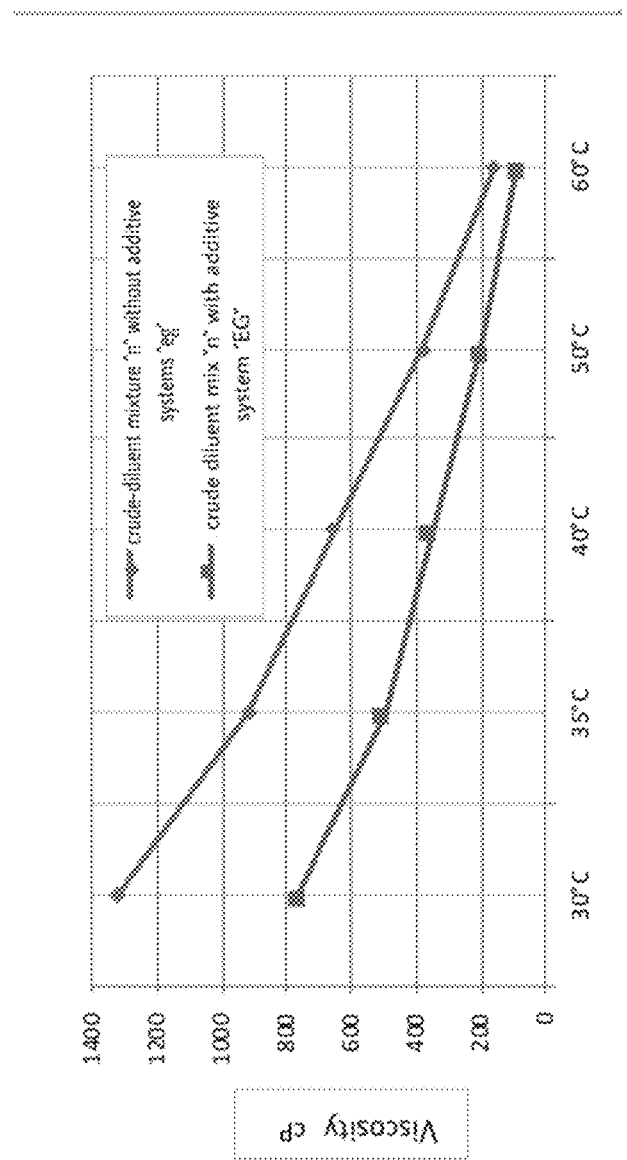
FIG. 7 shows the effect of the Additive system on the viscosity of the diluent "N" (Naphtha diluent) in heavy crude-diluent mixtures.

As shown in FIG. 7, an effect of the Additive system on the viscosity of diluent "N" in heavy crude-diluent mixtures is evident. Indeed, in FIG. 7 the rheological behavior of the crude-diluent mixture "N" is compared with the crude diluent mixture "N" treated with the additive system "EG" according to the present invention. From the above, it can be seen that there is a further reduction in viscosity in the entire temperature range (between 30 and 60° C.), observing, for example, that at 30° C. there are 1250 cP for the mixture without the "EG" additive system. while the mixture added with "EG" falls to 790 cP (36.8% reduction in viscosity).

Figure 8:
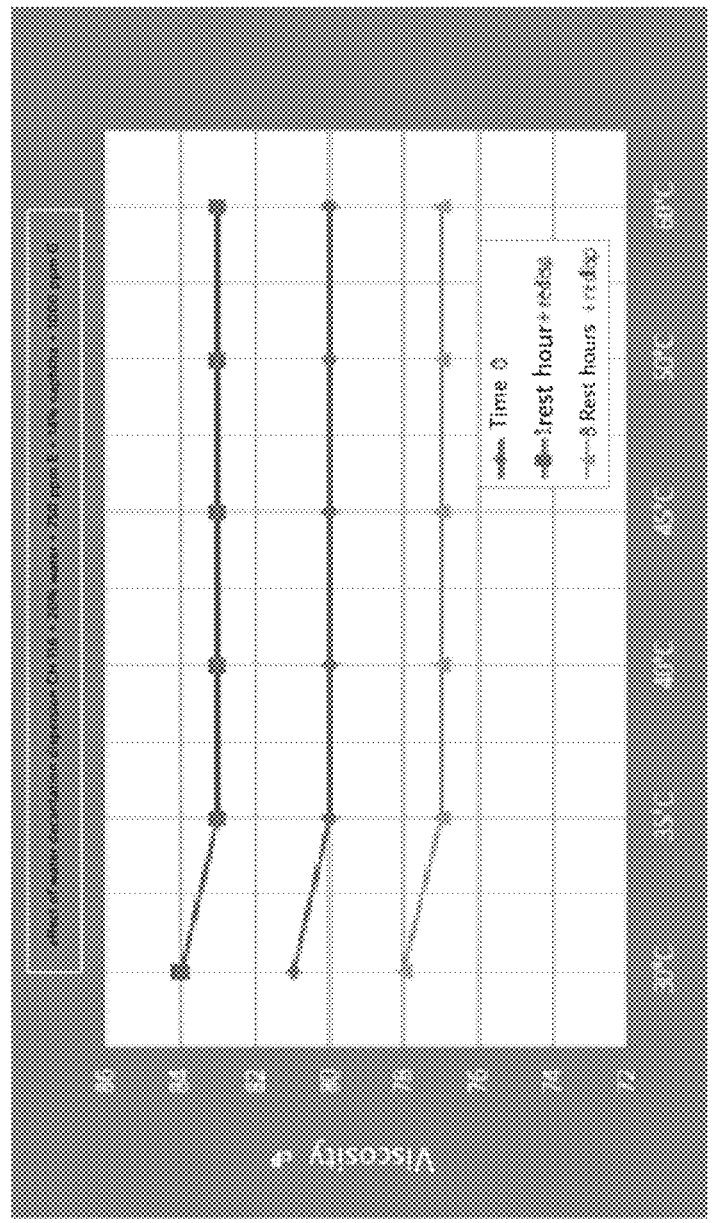
FIG. 8 shows the rheological behavior of the dispersion under static and dynamic conditions (Time of rest and disturbance of the system).

Example 6. Effect of Additive "E" on the Stability Characteristics of the Crude-Water Dispersion Formation In accordance with what is shown in FIG. 8 which teaches the rheological behavior of the dispersion under static and dynamic conditions (Time of rest and disturbance of the system), it is observed that the dispersion under static conditions is separated, however, when applying any disturbance (dynamic condition), it is re-dispersed keeping the original Rheological characteristics. FIG. 8 relates the effect of a dispersion at time OH, 1H and 8H ($\pm 3$ cP variation), confirming stability over time and under confined conditions and against the dynamic state.

Example 7. Effect of the Additive System "EG" on the Quality of the Water Removed after Breakage of Dispersions Comparison of the water qualities generated in the process with and without an additive system.

Figure 10:
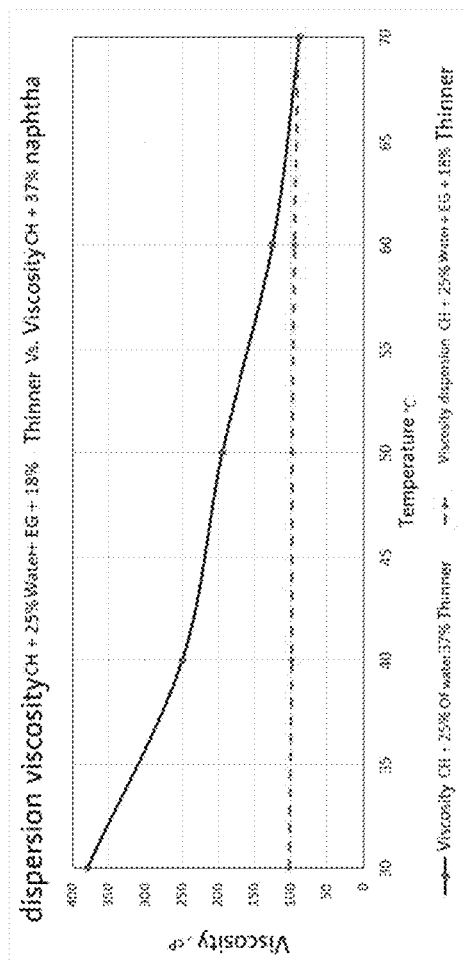
FIG. 10 shows the variation of the viscosity index of mixtures without additive Vs. a mixture treated with EG additive system (E collection flow improving surfactant additive and G dilution power enhancing additive N diluent according to the invention).

As it can be seen in FIG. 10, a crude oil mixture with diluent without additive shows a high variation of viscosity with temperature, while the crude oil mixture with diluent added with EG according to the invention, advantageously shows that its viscosity does not show appreciable (approximately constant) variation in viscosity with temperature.

TABLE 1

Water quality after the dehydration process with and without additives.

| IDENTIFICATION | DBO Mg 02/l | DQO Mg 02/l | CHLORIDES Mg CL/l | PHENOLS Mg/l | FATS AND OILS Mg/l | SURFUCTORS Mg saam/L |
|---|---|---|---|---|---|---|
| PROCESS WATER DESH. OF CHI RAW + 37% THINNER - WITHOUT ADDITION OF GE ADDITIVE SYSTEMS | 380 | 4290 | 1277 | 0.61 | 84 | <0.3 |
| PROCESS WATER DESH. CHI RAW + 37% THINNER + ADDITION OF GE ADDITIVE SYSTEMS | 382 | 3932 | 1011 | 0.59 | 34 | <0.3 |

TABLE 2

Typical ranges of quality of production water in the field after the dehydration process.

| IDENTIFICATION | DBO Mg 02/l | DQO Mg 02/l | CHLORIDES Mg CL/l | PHENOLS Mg/l | FATS AND OILS Mg/l | SURFUCTORS Mg saam/L |
|---|---|---|---|---|---|---|
| CHI-CASO CAMPO DEHYDRATION PROCESS WATER | 50-461 | 400-5200 | 700-2000 | 0.52-3.0 | 30-2000 | <0.28 |

Table 1 shows that there is no negative effect on the quality of the water resulting from the dehydration process of the mixture treated with the EG additive system according to the present invention when compared to the quality of the water separated with the conventional process currently used. Table 2 shows the historical water quality data from the dehydration process over a period of 3 months.

Figure 9:
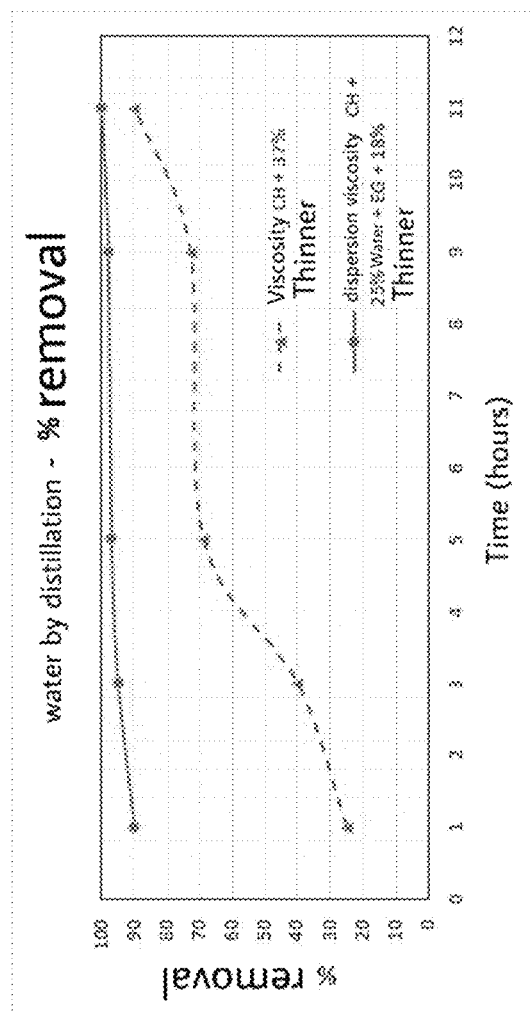
FIG. 9 shows the velocity of removal of the dehydrating water from mixtures treated with the additive system.

Example 8. Effect of the Additive System "EG" on the Speed of Water Separation in the Dehydration Process According to what is shown in FIG. 9, the speed of removal of the water in dehydration of mixtures treated with additive systems is improved, since FIG. 9 shows the improvement in time of separation of the oil-water phases in the process dehydration of crude-water-diluent mixtures treated with the EG additive system according to the invention, when compared to the current conventional process. It is observed that in one hour of treatment a removal of 90% is reached, while with the traditional process only 25% is reached in the same period. Additionally, it is highlighted that a lower volumetric diluent is required in the dehydration train.

Therefore, the additive system according to the present invention improves the dehydration processes of heavy and extra-heavy crudes, promoting high coalescence of water drops, reducing water drainage times and the consumption of diluent.

Example 9. Effect of the Additive System "EG" on the Viscosity Index of the Crude Mix FIG. 10 shows the variation in the viscosity index of mixtures without additive Vs. A mixture treated with the EG additive system.

This effect is beneficial in the case of pipeline transport where temperature variations are generated by changes in the altitude of the pipeline, promoting energy savings in the pumping system.

The invention claimed is:

1. A formulation of additives to improve the flow capacity and enhance the dilution capacity of diluents in production and transport processes of heavy and extra-heavy crudes, characterized in that said system links an additive E that comprises:
    Aliphatic and/or aromatic alcohols with carbon number between 2 and 30 carbon atoms (C2-C30) and their corresponding ethoxylated compounds;
    primary, secondary and tertiary alcohols, diols, polyols, glycol ethers, or mixtures thereof, in concentration ranges between 2 and 20% by weight;
    sulphonic acids, sulphonic esters, alkyl sulphonates of sodium, potassium, calcium or a mixture of these in a concentration between 0.5 and 10% by weight;
    hydroxide of sodium, potassium, calcium and magnesium or mixtures thereof in a concentration between 0.4 and 20% by weight;
    ethers of 2 to 6 carbons, in concentrations between 2 to 18% by weight;
    sulfonated vegetable oils in concentrations between 2 and 8% by weight;
    dispersants for oil-based fluids comprise saturated, unsaturated fatty acids, fatty hydroxy acids, and/or salts or esters derived from vegetable oils in any of their combinations or derivatives in concentrations between 0.2% and 8% by weight;

water in weight concentration between 3.5 and 8%; and organic solvents; wherein said organic solvents are of the aliphatic or aromatic type in a range from 42% to 78% by weight.

2. The formulation of additives to improve the flow capacity and enhance the dilution capacity of diluents in production and transport processes of heavy and extra-heavy crudes according to claim 1, wherein, in addition to additive E, this system combines an additive G comprising Dispersants for oil-based fluids in aliphatic and/or aromatic solvents with carbon numbers between 2 and 22 carbon atoms (C2-C30) and their ethoxylated compounds, combinations thereof or derivatives in concentration ranges between 5 and 30% in weight;

mono, di and trialkylated organic solvents with aliphatic compounds, or mixtures thereof from petroleum distillation in concentration ranges between 35% and 75%;

phospholipids, glycerol esters, butyl acid, acids: lauric, palmitic, stearic, vegetable oils or mixtures thereof, and/or derivatives or raw materials that contain these compounds, and which are in a concentration range between 8-22% in weight Alcohols and/or glycols with carbon numbers between 2 and 22 carbon atoms (C2-C22) and/or their corresponding ethoxylated compounds or combinations thereof or found in additive E, are in concentration ranges between 5 and 25% by weight;

polyol esters, glycol esters, glycerin esters, sorbitan esters, polyethylene glycol esters (PEG), trimethylpropane esters (TMP), polyol esters, and/or their derivatives and/or combinations thereof, are found in concentration ranges of 0.1-15% by weight.

3. A process of production, dehydration and transportation of heavy and extra-heavy crudes from conventional recoveries by using the formulation of additive according to claim 2, which comprises the steps of
  a) add one of the additives of the invention (additive E) to wellhead pressure conditions: 300 psi (2.07 MPa), in line to the fluids coming from heavy crude oil or extra heavy oil and water, —Pressure drops: 230 psi (1.59 MPa) and Flow: 94,000 BPD of fluids; and
  b) add to a diluent the additive G for the dilution of the heavy and extra heavy crudes in the dehydration and transport step thereof, the treatment temperature conditions between: 60° C.-70° C., and a total injection of diluent: between 18%-20%.

4. The production, dehydration and transportation process of heavy and extra-heavy crudes from conventional recoveries according to claim 3, wherein the diluents to which the additives are added are gasoline, naphtha, diesel, biodiesel or mixtures thereof.

5. The formulation of additives to improve the flow capacity and enhance the dilution capacity of diluents in production and transport processes of heavy and extra-heavy crudes according to claim 1, wherein in said system the primary, secondary alcohols and tertiary are methanol, ethanol, propanol, isopropanol, butanol, isobutanol, terbutanol, or a mixture thereof.

6. The formulation of the additive system to improve the flow capacity and enhance the dilution capacity of diluents in production and transport processes of heavy and extra-heavy crudes according to claim 1, wherein the ethers from 2 to 6 Carbons are methoxyethane, methoxymethane, 3,3-oxypropane, ethane-oxyethane ethyl ether, or mixtures thereof.

7. The formulation of additives to improve the flow capacity and enhance the dilution capacity of diluents in production and transport processes of heavy and extra-heavy crudes according to claim 1, wherein the sulfonated vegetable oils are olive, sunflower oil, soybean oil, palm oil, sesame oil, peanut oil, safflower oil, castor oil, rapeseed oil, or combinations thereof.

8. The additive system to improve the flow capacity and enhance the dilution capacity of diluents in production and transport processes of heavy and extra-heavy crudes according to claim 1, wherein the organic solvents of the additive system are aliphatic or aromatic type, where the aliphatic solvents contain from 1 to 18 carbon atoms and the aromatic solvents are benzene, xylene, toluene or with one or more chains of straight or branched chain aliphatic substituents that comprise between 1 and 12 atoms carbon, or mixtures thereof.

9. The additive system to improve the flow capacity and enhance the dilution capacity of diluents in production and transport processes of heavy and extra-heavy crudes according to claim 1, wherein the organic solvent is Ethylene Glycol and/or its derivatives and/or this compound is present in the raw material.

10. The formulation of claim 1, wherein the aromatic alcohols with alkyl chains with carbon number of 4 to 12 carbon atoms (C4 to C12) and derivatives in concentration ranges are between 5 and 75% by weight.

* * * * *